(12) United States Patent
Norris et al.

(10) Patent No.: US 11,050,594 B2
(45) Date of Patent: Jun. 29, 2021

(54) COMMUNICATIONS SYSTEM HAVING MULTIPLE SPREAD CARRIERS AND ASSOCIATED METHODS

(71) Applicant: HARRIS GLOBAL COMMUNICATIONS, INC., Albany, NY (US)

(72) Inventors: James A. Norris, Fairport, NY (US); Christopher D. Mackey, Spencerport, NY (US); Richard J. Buckley, Chandler, AZ (US); Myung K. Lee, Penfield, NY (US); Shane B. Eisenman, Rochester, NY (US)

(73) Assignee: HARRIS GLOBAL COMMUNICATIONS, INC., Albany, NY (US)

( * ) Notice: Subject to any disclaimer, the term of this patent is extended or adjusted under 35 U.S.C. 154(b) by 0 days.

(21) Appl. No.: 16/701,203

(22) Filed: Dec. 3, 2019

(65) Prior Publication Data

US 2021/0168003 A1 Jun. 3, 2021

(51) Int. Cl.
*H04L 27/26* (2006.01)
*H04J 13/00* (2011.01)
*H04B 1/707* (2011.01)
*H04B 1/71* (2011.01)

(52) U.S. Cl.
CPC ........ *H04L 27/2601* (2013.01); *H04B 1/707* (2013.01); *H04J 13/0048* (2013.01); *H04B 1/71* (2013.01)

(58) Field of Classification Search
CPC ....... H04L 27/2601; H04B 1/707; H04B 1/71; H04J 13/0048
See application file for complete search history.

(56) References Cited

U.S. PATENT DOCUMENTS

| | | | |
|---|---|---|---|
| 5,224,120 A | * | 6/1993 | Schilling ............... G01S 5/0036 370/342 |
| 5,712,869 A | * | 1/1998 | Lee ........................ H04B 1/707 375/141 |

(Continued)

FOREIGN PATENT DOCUMENTS

| | | |
|---|---|---|
| KR | 102160140018 | 12/2016 |
| WO | 2007137270 | 11/2007 |

(Continued)

OTHER PUBLICATIONS

Yin et al., "Transmitter-Receiver Design in Multicarrier CDMA Communications". Dept. of Electrical Engineering, University of Washington, IEEE, 1998, pp. 1823-1827.

*Primary Examiner* — Syed Haider
(74) *Attorney, Agent, or Firm* — Allen, Dyer, Doppelt + Gilchrist, P.A.

(57) ABSTRACT

A communications system may include a transmitter having spreading stages configured to spread a common modulated baseband input data stream based upon respective coefficient sequences; a plurality of upconverters, each having a different frequency; and an RF output stage that generates an RF output signal. A receiver may include an RF input stage that receives an RF input signal, a plurality of downconverters, a plurality of despreading stages, and a demodulator coupled to the despreading stages.

17 Claims, 13 Drawing Sheets

(56) References Cited

U.S. PATENT DOCUMENTS

| | | | | |
|---|---|---|---|---|
| 5,790,588 | A * | 8/1998 | Fukawa | H04B 1/7103 |
| | | | | 370/342 |
| 6,215,777 | B1 * | 4/2001 | Chen | H04J 1/00 |
| | | | | 370/335 |
| 7,324,432 | B1 * | 1/2008 | Kim | H04L 27/0014 |
| | | | | 370/208 |
| 2002/0191566 | A1 * | 12/2002 | Fogel | H04B 7/2618 |
| | | | | 370/335 |
| 2003/0179776 | A1 * | 9/2003 | Sumasu | H04L 27/3455 |
| | | | | 370/491 |
| 2008/0253277 | A1 | 10/2008 | Lee et al. | |
| 2018/0167939 | A1 | 6/2018 | Kim et al. | |

FOREIGN PATENT DOCUMENTS

| | | |
|---|---|---|
| WO | 2008009013 | 1/2008 |
| WO | 2011093511 | 8/2011 |

\* cited by examiner

COMMUNICATIONS SYSTEM HAVING MULTIPLE SPREAD CARRIERS AND ASSOCIATED METHODS

FIELD OF THE INVENTION

The present invention relates to communications systems, and, more particularly, to multicarrier communications systems and related methods.

BACKGROUND OF THE INVENTION

Code Division Multiple Access (CDMA) Spread Spectrum is a widely known and commonly used spread spectrum technique in the communications industry. By spreading data signals over a wider bandwidth and recovering the signal by despreading, the CDMA spread spectrum system provides several benefits. One benefit is reducing SNR required for successful communication which translates to increased link range. In addition, low RF profile over-the-air communications from signal spreading makes unwanted detection difficult. Another important benefit is the resilience to interference from other transmitters. In CDMA, the use of multiple, unique spreading codes allows multiple unique communication channels to exist within the same frequency range. CDMA techniques are used in cellular applications to increase the number of users within an allocated frequency spectrum.

Spreading and despreading the CDMA Spread Spectrum signal require high sample rates and fast complex multiplications that are processing intensive. In applications where spreading the data signal over a very wide bandwidth (100's MHz) is desired, the digital-to-analog converters (DAC) and analog-to-digital converters (ADC) require very high sample rates and very fast processing devices. As the desired bandwidth increases to multiple GHz, the required sample rates and processing needs reach beyond the capability of the current commercially-available device technology. While efforts exist in the industry to create very high sample rate devices, these devices proved to be very expensive and not ready for viable product development.

Multicarrier modulation is a communications technique in which the data is transmitted over multiple carriers that are normally closely spaced from each another. In general, each carrier is modulated at lower sample rates and combined to form data with higher sample rates as a group. Multicarrier modulation has several advantages, including resilience to multi-path, narrowband fading, and interfering signals. Common multicarrier modulation techniques include Orthogonal Frequency Division Multiplexing (OFDM) modulation and Filter Bank Multicarrier (FBMC) modulation, which modifies OFDM by filtering the side lobes of the OFDM communications signal. In OFDM and FBMC, the data is interleaved over multiple modulated carriers with lower rates.

SUMMARY OF THE INVENTION

In general, a communications system may include a transmitter that may comprise a plurality of spreading stages configured to spread a common modulated baseband input data stream based upon respective coefficient sequences, a plurality of upconverters, each upconverter coupled to a respective spreading stage, and each upconverter having a different frequency, and an RF output stage coupled to the plurality of upconverters to generate an RE output signal. A receiver may include an RF input stage configured to receive an RF input signal, a plurality of downconverters coupled to the RE input stage, a plurality of despreading stages, each despreading stage coupled to a respective converter, and a demodulator coupled to the plurality of despreading stages.

The transmitter may comprise a modulator configured to generate the common modulated baseband input data stream. Each of the spreading stages may operate using a common spreading sequence, or in another example, each of the spreading stages may operate using a different spreading sequence. The RF output stage may comprise a plurality of upconverters, a plurality of digital-to-analog converters (DACs) coupled to the upconverters, a combiner coupled to the plurality of DACs, and another upconverter coupled to the combiner. In another example, the RF output stage includes a plurality of upconverters, a summer coupled to the plurality of upconverters, and a digital-to-analog converter (DAC) coupled to the summer. The different operating frequencies of the plurality of upconverters may be configured to generate a plurality of carriers, each with a guard band associated therewith.

The receiver may comprise a RF Input Stage composed of an RE downconverter, a splitter, and a plurality of analog-to-digital converters (ADCs) coupled thereto. The demodulator may be configured to perform a demodulation and time alignment upstream of the demodulation. In some embodiments, the transmitter and receiver are co-located as a transceiver, and in another embodiment, the transmitter and receiver may be spaced apart from one another. The receiver may be configured to send a transmitter control signal based upon channel availability.

In another example, a transmitter may include a plurality of spreading stages configured to spread a common modulated baseband input data stream based upon a respective coefficient sequence, and a plurality of upconverters, each upconverter coupled to a respective spreading stage, and each upconverter having a different frequency. An RE output stage may be coupled to the plurality of upconverters to generate an RE output signal.

In yet another example, a receiver may include an RF input stage configured to receive an RF input signal, a plurality of downconverters coupled to the RF input stage, and a plurality of despreading stages, each despreading stage coupled to a respective downconverter. A demodulator may be coupled to the plurality of despreading stages.

Another aspect is directed to a method of operating a transmitter that may comprise spreading with a plurality of spreading stages a common modulated baseband input data stream based upon a respective coefficient sequence and upconverting the baseband input data stream with a plurality of upconverters, each upconverter coupled to a respective spreading stage, and each upconverter having a different frequency. The method may also include generating an RF output signal with an RF output stage coupled to the plurality of upconverters.

Yet another aspect is directed to a method of operating a receiver that may comprise receiving an RF input signal with an RF input stage and downconverting the input signal with a plurality of downconverters coupled to the RF input stage. The method may include despreading the input signal with despreading stages, each despreading stage coupled to a respective downconverter, and demodulating the input signal with a demodulator coupled to the plurality of despreading stages.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout and prime notation used for other embodiments.

The system as will be described allows the spreading and despreading of a CDMA Spread Spectrum signal over an extremely wide bandwidth using existing devices with lower sampling rates and processing speeds. Spreading and despreading CMDA Spread Spectrum signals over an extremely wide bandwidth (i.e., multi-GHz) requires ADCs and DACs with high sample rates and very fast and power-hungry processing devices. The system in an example includes multiple DACs and ADCs with lower sample rates that create and sample multiple spread spectrum sub-bands across the desired bandwidth in lieu of a single DAC and an ADC processing a single carrier signal within the desired bandwidth. By adjusting the frequencies of RF upconverters and combining, the multiple carriers are created to form the constituent sub-bands of the final signal in the desired total signal bandwidth. Advantages include: 1) a multi-GHz spread spectrum communications system that may be built with available lower sample rate devices; 2) inherently modular designs that allow for scalability to adjust for different aggregate signal bandwidth and available implementation space; and 3) obtaining the benefits of both spread spectrum and multicarrier modulation.

Figure 1:
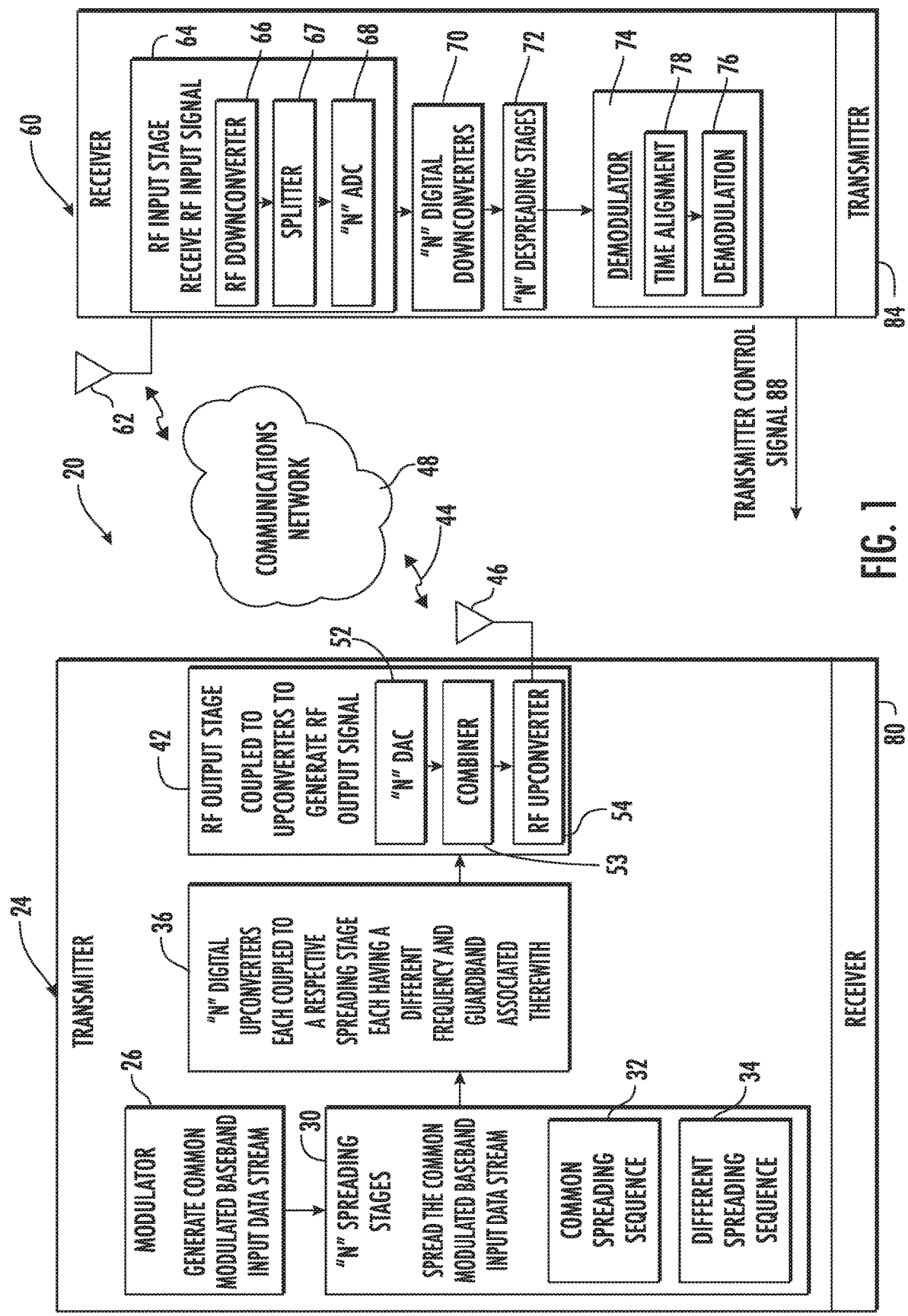
FIG. 1 is a block diagram of a general implementation of the communications system according to the invention.

Referring initially to FIG. 1, a RF communications system is illustrated generally at 20 and includes a transmitter 24 having a modulator 26 that is configured to generate a common modulated baseband input data stream. The modulator 26 is operatively connected to a plurality of spreading stages shown as "n" spreading stages at 30. The spreading stages 30 are configured to spread the common modulated baseband input data stream based upon respective coefficient sequences. The input data stream has multiple copies and the multiple copies are spread. It should be understood that the spreading stages 30 may be operative using a common spreading sequence 32 or different spreading sequences 34 or a combination of both. Variation of spreading sequences used from channel to channel can decrease the likelihood of unwanted interception and decoding of transmitted data.

Figure 2:
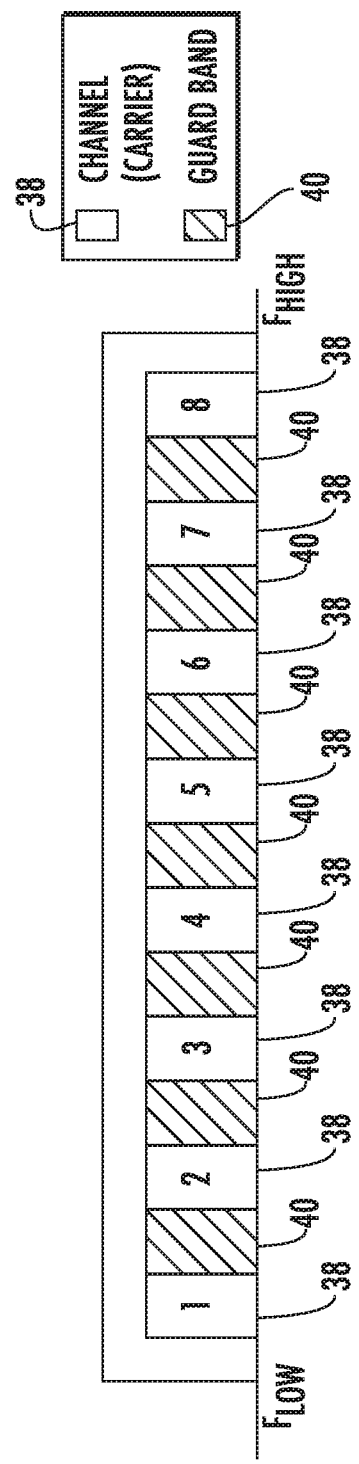
FIG. 2 is a diagram showing a multiple spread spectrum carriers and guard bands between each carrier in the RF output signal of the communications system of FIG. 1.

A plurality of digital upconverters shown as "n" upconverters at 36 are connected to the plurality of spreading stages 30. Each upconverter 36 is coupled to a respective spreading stage 30 and each upconverter has a different frequency. These different operating frequencies of the plurality of upconverters 36 are configured to generate a plurality of carriers 38, each with a guard band 40 associated therewith, as shown in FIG. 2, where the different channels for each carrier are labeled 1-8 in this example, and showing the guard band between each channel.

An RF output stage 42 is coupled to the upconverters 36 to generate an RF output signal 44 that is transmitted via antenna 46 from the transmitter 24 to a communications network illustrated at 48, and in this example, a wireless communications network, although other communications networks may be used. The RE output stage 42 may include a plurality of digital-to-analog converters (DACs) 52 coupled to the respective digital upconverter 36. An RF signal combiner 53 is coupled to the DAC 52 and combines the multiple carriers spaced with guard bands into one RF signal. An RF upconverter 54 is coupled to the combiner 53 and the DACs 52 and upconverts the signal received from the combiner 53 into the RF output signal at a higher RE frequency 44.

The RF output signal 44 is transmitted via the RF antenna 46 over the air, in this example, through the communications network 48 to a receiver operative as a RF receiver, and indicated generally at 60, via the receiver antenna 62 and into an RF input stage 64 configured to receive the RF input signal via the antenna. The RF input stage 64 includes an RF downconverter 66, a signal splitter 67, and a plurality of analog-to-digital converters (ADCs) 68 coupled to each leg of the signal splitter. Each ADC 68 converts the respective downconverted sub-carrier of the RF input signal into a digital signal for further processing. The digital signal is digitally downconverted in a plurality of downconverters illustrated generally by "n" digital downconverters at 70 and despread in a plurality of despreading stages, shown generally by "n" despreading stages at 72, with each despreading stage coupled to a respective downconverter. A demodulator 74 is coupled to the despreading stages 72 and configured to perform a demodulation 76 and time alignment 78 upstream of the demodulation as will be explained in greater detail below.

The transmitter 24 and receiver 60 have been described as spaced apart from each other and the RF output signal 44 transmitted from the RF transmitter (DAC) 24 to the receiver via the communications network 48. It should be understood that the transmitter 24 may include a co-located receiver illustrated generally at 80 and having the same components and functionality as receiver 60 to form an RF transceiver, e.g., a mobile wireless communications device. The receiver 60 may include a co-located transmitter indicated generally at 84 and forming a transceiver such as a mobile wireless communications device. The receiver 60 may be configured to send a transmitter control signal 88 based upon channel availability to increase resilience in the presence of impairment and optimize radio resources as explained in greater detail below. The transmitter control signal 88 may be transmitted from a separate circuit as part of the receiver 60 or from a co-located RF transmitter 84. Both the RF transmitter 24 and receiver 60 may include processors, such as the digital signal processors and field programmable gate arrays explained in further detail relative to the embodiment of FIG. 11.

Figure 3:
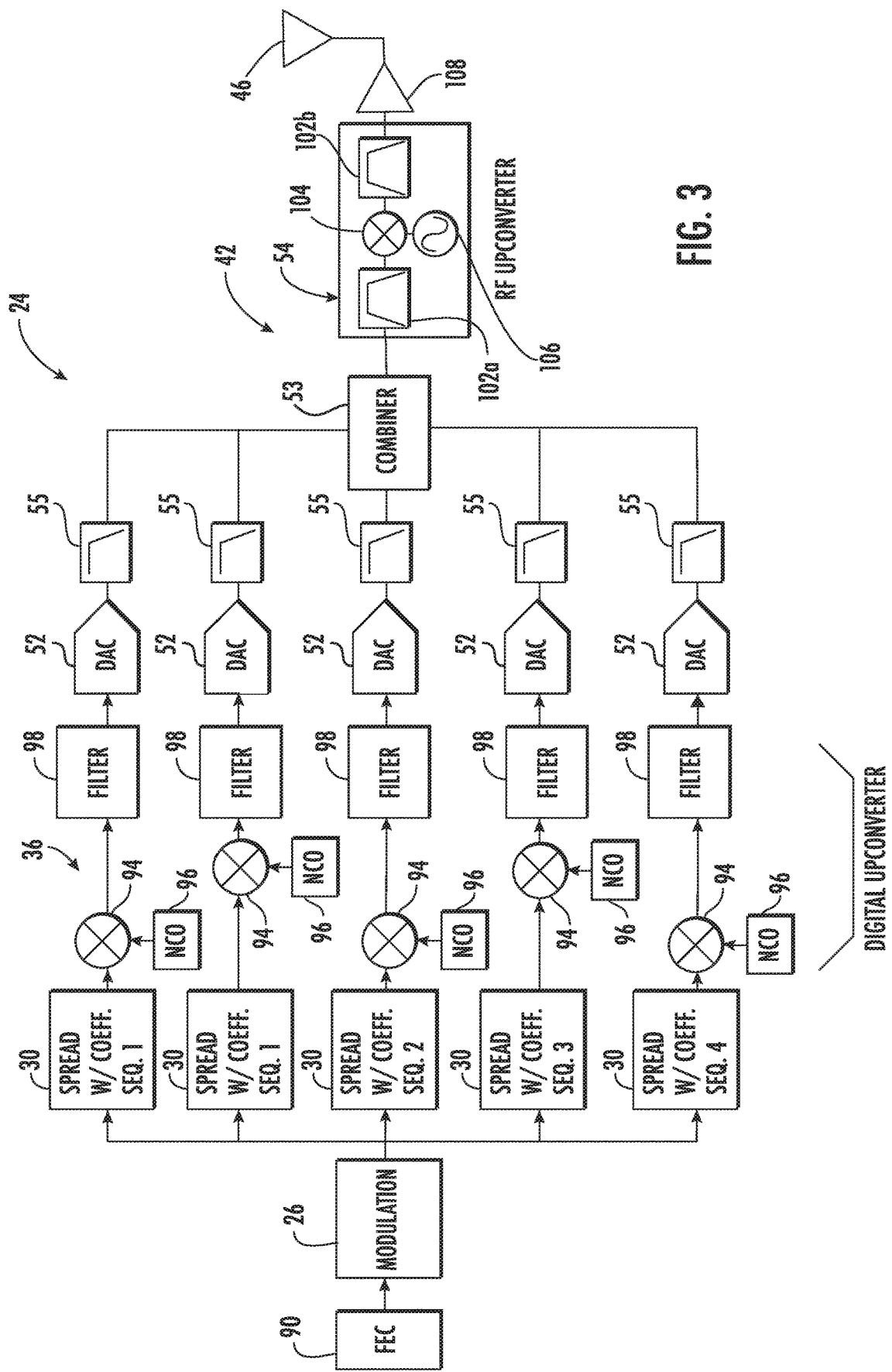
FIG. 3 is a schematic block diagram showing major components in the transmitter of the communications system of FIG. 1.

Referring now to FIG. 3, there are shown greater details of the transmitter 24 operating in this non-limiting example with five carriers and showing five spreading stages 30 that are configured to spread the common modulated baseband input data stream received originally from a data source as input data 90. The input data 90 is modulated in modulator 26 and copied so that the same data is spread within the five spreading stages 30. Each of the spreading stages 30 receives a specific spreading coefficient sequence. In this example as illustrated in FIG. 3, two of the spreading coefficient sequences for two spreading stages 30 in two channels are the same and indicated as spreading coefficient sequence 1, and the other three spreading stages 30 in the remaining three channels have different coefficient spreading sequences indicated as spreading coefficient sequences 2, 3, and 4, as received within the respective spreading stages. The spreading stages 30 may also operate using a common spreading sequence, i.e., the same spreading coefficient sequence for all five spreading stages 30 resulting in a less complex and more simple implementation, or each of the five different spreading stages may operate using a different spreading coefficient sequence, i.e., all five are different, resulting in more complex operation and greater difficulty to intercept and decode.

The signal, once digitally spread, is received within the plurality of upconverters 36, where each upconverter is connected to a respective spreading stage 30. Each upconverter 36 includes mixer 94 that receives a synthesized local oscillator signal from a numerically controlled oscillator (NCO) 96 to convert each respective spread signal from a spreading stage 30 digitally into an intermediate frequency. Each NCO 96 digitally generates its local oscillator signal such that the plurality of carriers 38 are generated and spaced to each other and include a guard band 40 between them as shown in FIG. 2, and forming multiple carriers. The use of identical or different coefficient sequences for the same or different spreading sequences 30 may be applied interchangeably for each sub-band or carrier 38 and increase the difficulty to intercept for a low probability of detection. Each signal from a respective spreading stage 30 is separately upconverted to an IF frequency in the mixers 94 and filtered by respective filters 98 connected to each mixer 94 to reduce side lobes. After filtering, each carrier signal is sampled out via the respective DAC 52, and bundled by a combiner 53 to form a single multicarrier signal at an intermediate frequency. From each DAC 52, the signal passes through a low pass filter 55 and then combined in combiner 53. The output of the combiner 53 may be upconverted again to a higher radio frequency (RF) output signal 44 in the RF upconverter 54 that includes first and second bandpass filters 102a, 102b, RF mixer 104, and local oscillator (LO) 106 and power amplifier 108 as illustrated. The spacing between the channels or carriers 38 remains the same, but the RF output signals are upconverted at this point.

In this example, each channel or carrier 38 is a 40 MHz spread spectrum channel that includes the same data that is modulated and then spread with 4,000 coefficient spreading sequences, which include two 4,000 coefficient spreading sequences that are the same while the other coefficient spreading sequences are different. It is possible, of course, to use the same 4,000 coefficient spreading sequence on all five spreading stages 30 for a simpler implementation or have all different spreading sequences. The number of channels may vary, of course, up to 10, 15, 20 or more channels depending on design. The peak-to-average power ratio (PAPR) of the aggregate signal increases as the number of channels increases. A higher PAPR may limit the overall communications system 20 performance both in transmitted power and transmitter 24 and receiver 60 efficiency. The signal may be treated with a PAPR reduction technique, such as via a crest factor reduction filter with a phase offset to minimize system performance degradation. The timing and phase alignment between carriers must be maintained closely through the transmit and receive process for maximum system performance.

Figure 4:
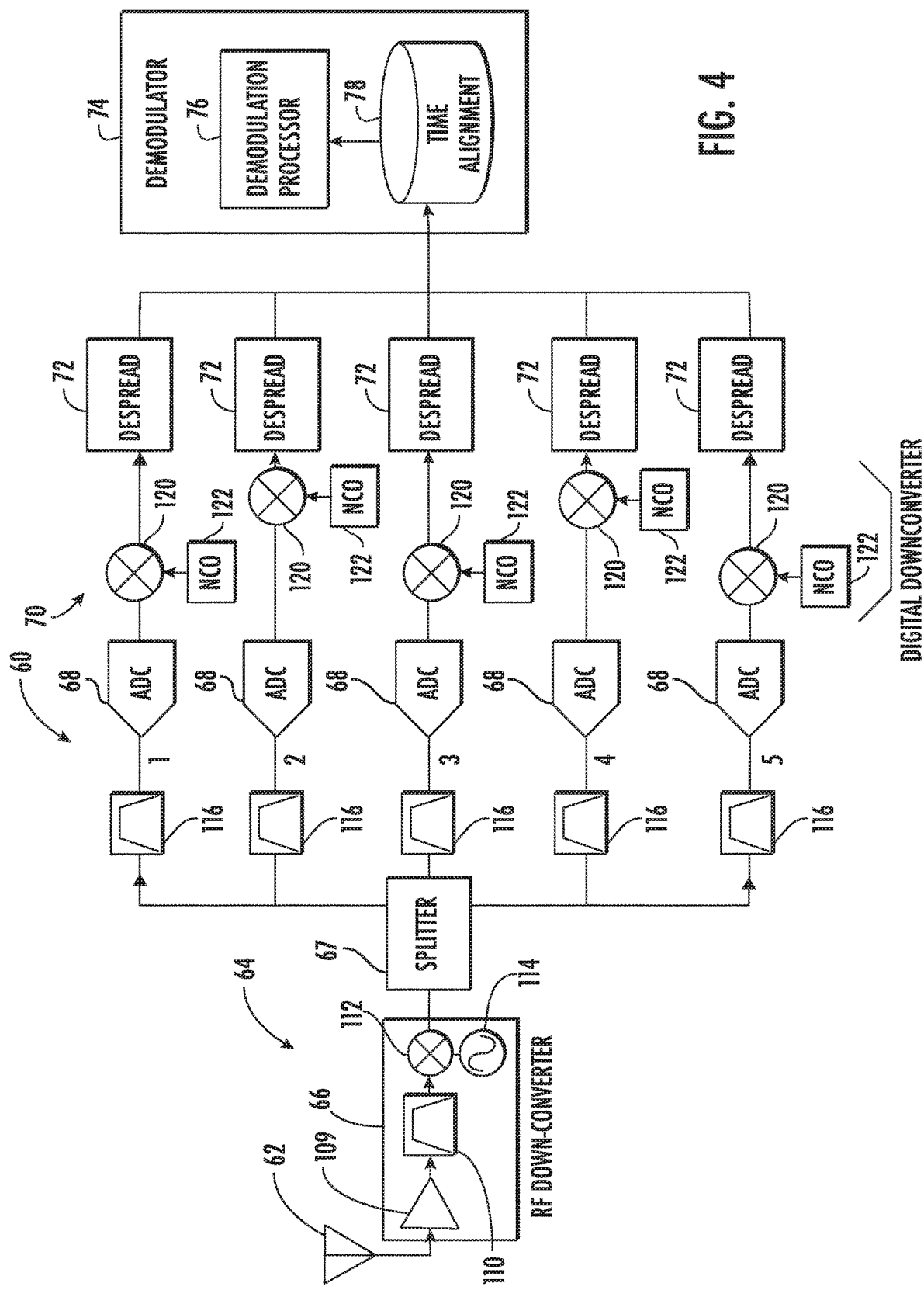
FIG. 4 is a schematic block diagram showing major components in the receiver of the communications system of FIG. 1.

Referring now to FIG. 4, there are illustrated greater details of the receiver 60 and showing the RF input stage 64 that is configured to receive the RF input signal via receiver antenna 62 into the RF downconverter 66 that includes a low noise amplifier 109, bandpass filter 110 and a mixer 112 that receives the local oscillator signal from the local oscillator 114. The downconverted signals are passed into a splitter 67 that splits the multicarrier signal five ways in this example. Each carrier is filtered by an anti-alias filter 116 and the sub-bands as carriers 38 are sampled out at the respective ADCs 68. The five sub-bands in this example correspond to the five sub-bands from the transmitter 24. Once digital conversion occurs and sub-bands sampled, the signals are received at the digital downconverters 70, which each include a mixer 120 for each carrier 38 or sub-band. Each mixer 120 receives the numerically controlled local oscillator signal generated from the numerically controlled oscillators (NCO) 122 to downconvert into respective signals for despreading.

The five despreading stages 72 are each coupled to a respective mixer 120 as part of the respective downconverter 70, and in this example, each despreading stage 72 is a 4,000 coefficient chip multiply/accumulate circuit corresponding to the respective spreading sequences in the transmitter 24, but in this case, for despreading. The demodulator 74 includes a demodulation processor for demodulation 76 and time alignment circuit 78 that is upstream of the demodulation. During demodulation within the demodulator 74, the five carriers 38 are correlated to boost the signal-to-noise (SNR) ratio and obtain better signal strength via correlation of the signals. The time alignment circuit 78 may be formed as part of the demodulation processor 76 with sufficient memory storage for correlation. Each channel or carrier 38, also termed sub-carrier, provides a processing gain so that the cumulative processing gain is about $10 \times \log 10$ (n) decibel, where n is the total number of channels. In this example, n is five channels as illustrated, but could be any number of channels that align with the number of channels from the RF transmitter 24.

In addition, each channel as a carrier or sub-carrier provides a processing gain from spreading that is equal to $10 \times \log 10$ (x) decibels (dB), where x is the spreading ratio.

The total processing gain may be obtained by increasing the number of channels, i.e., n, and the spread ratio, x. In an example shown, each 4,000 coefficient multiply accumulate operation in a despreading stage 72 allows for a 16:1 spreading ratio. In this example shown of five channels at the receiver 60, the processing gain may be calculated with n=5 channels and X=16x spreading, with a total processing gain equal to about 10x log (5)+10×log (16), which is equal 7 dB+12 dB for a total of 19 dB of processing gain. Each separate channel may be required to despread the received signal, and the bandwidth of each channel may be limited by the number of coefficients and the chip rate for a multiply-accumulate circuit as part of the despreading stages 72. The output of each channel may be added into memory storage at the demodulator 74 to aid in detecting the signature from the correlation. Both the RF transmitter 24 and receiver 60 may include a field programmable gate array (FPGA) with data processing capability to increase signal spreading and correlation. An example of FPGA processing that may occur at the receiver 60 now follows:

$$SUM_{Channel} = \sum_{i=0}^{i=3999} ((C_{i,real} + jC_{i,imag}) * (y_{i,real} + jy_{i,imag}))$$

where:

$C_i$ is the expected preamble chip $Y_i$ is the received sample (at the chip rate)

Each FPGA complex multiply operation is expressed as $((C_{real}*y_{real})-(C_{imag}*y_{imag}))+j(C_{real}*y_{imag})+(C_{imag}*y_{real}))$ where 'j' represents the fact that the numbers to the right of T need to be kept in a separate memory. The SUM result is a complex number.

$$SUM_{Channel} = \sum_{i=0}^{i=15} ((W_{i,real} + jW_{i,imag}) * (y_{i,real} + jy_{i,imag}))$$

Figure 5:
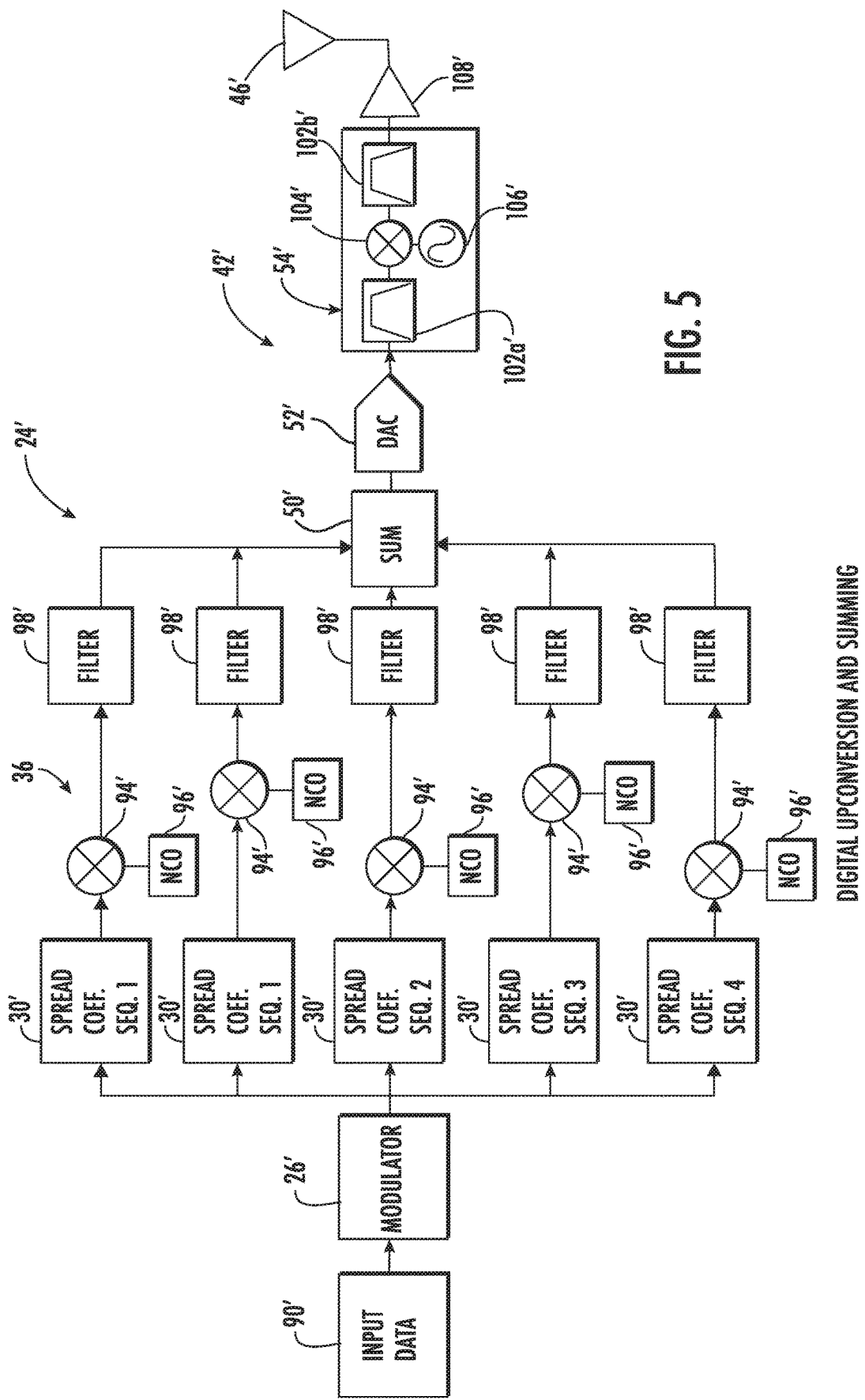
FIG. 5 is a schematic block diagram showing major components in the transmitter of another embodiment of the communications system.
Figure 6:
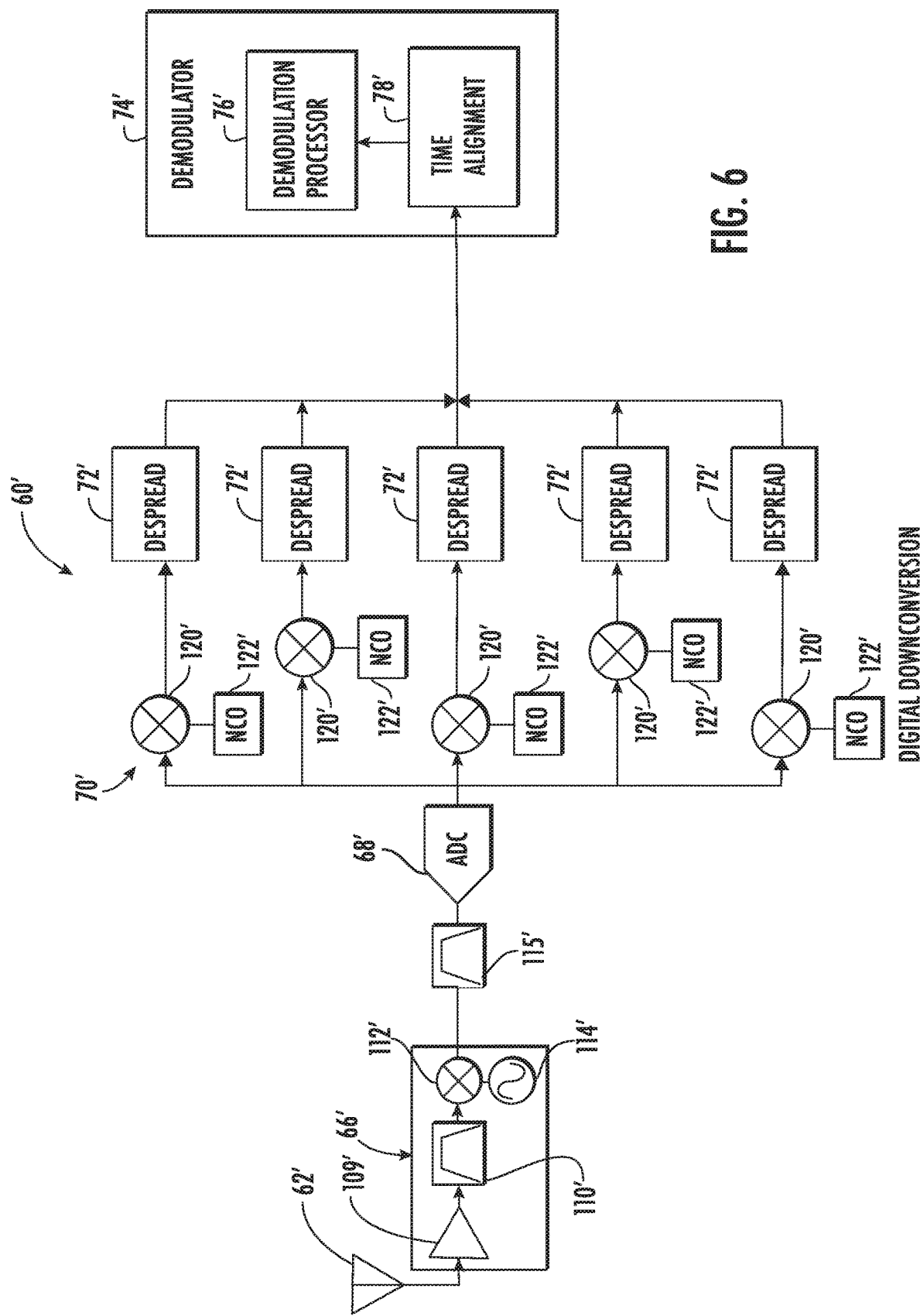
FIG. 6 is a schematic block diagram showing major components in the receiver of another embodiment of the communications system.

Referring now to FIGS. 5 and 6, there are illustrated another embodiment of the transmitter 24' and receiver 60'. The transmitter 24' includes a single DAC 52' and in this embodiment is used in the creation of multiple spread spectrum carriers. The receiver 60' includes a single ADC 68' used to receive multiple spread spectrum carriers. In these examples, those components that are similar to the components shown in the transmitter 24 and receiver 60 of FIGS. 3 and 4 are given the same numerical indices, but with prime notation.

In the transmitter 24' of FIG. 5, one summer 50' is used to receive the signals after digital upconversion from the filters 98' and then passed into a single DAC 52'. After conversion, the signals are received in the respective RF upconverter 54'. Likewise in the receiver of FIG. 6, instead of a plurality of ADCs, a single ADC 68' is used. After the RF downconversion, before the ADC 68', a bandpass filter 115' is incorporated.

Figure 7A:
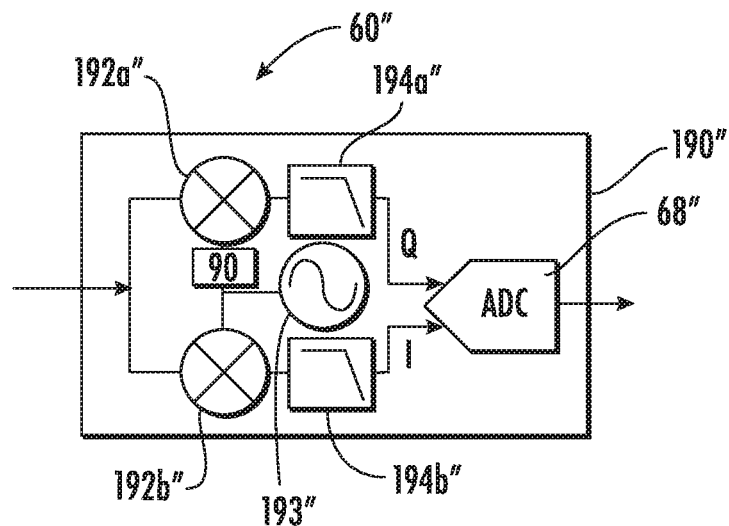
FIGS. 7A and 7B are diagrams showing examples of direct conversion of the multicarrier signal for the receiver and transmitter.
Figure 7B:
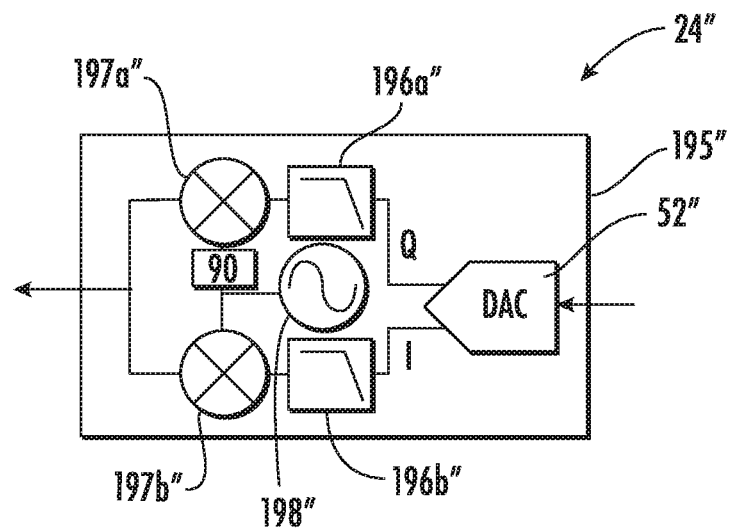

Referring now to FIGS. 7A and 7B, there are shown direct conversion implementations for multicarrier signal creation and reception for conversion to a baseband from the RF or from RF to baseband without conversion to the intermediate frequency. FIG. 7A illustrates a zero intermediate frequency downconverter system generally at 190". Double prime notation is used in these embodiments for similar components. The receiver 60" includes two mixers 192a", 192b" for in-phase (I) and quadrature (Q) signal production, an oscillator 193", and two low pas filters 194a", 194b" to filter signals Q and I, which are then digitally converted within ADC 68". The transmitter 24" includes a zero intermediate frequency upconverter system illustrated generally at 195" and includes the digital-to-analog converter 52" with Q and I signal output, followed by low pass filters 196a", 196b" and mixers 197a", 197b" and operative with an oscillator 198".

Figure 8:
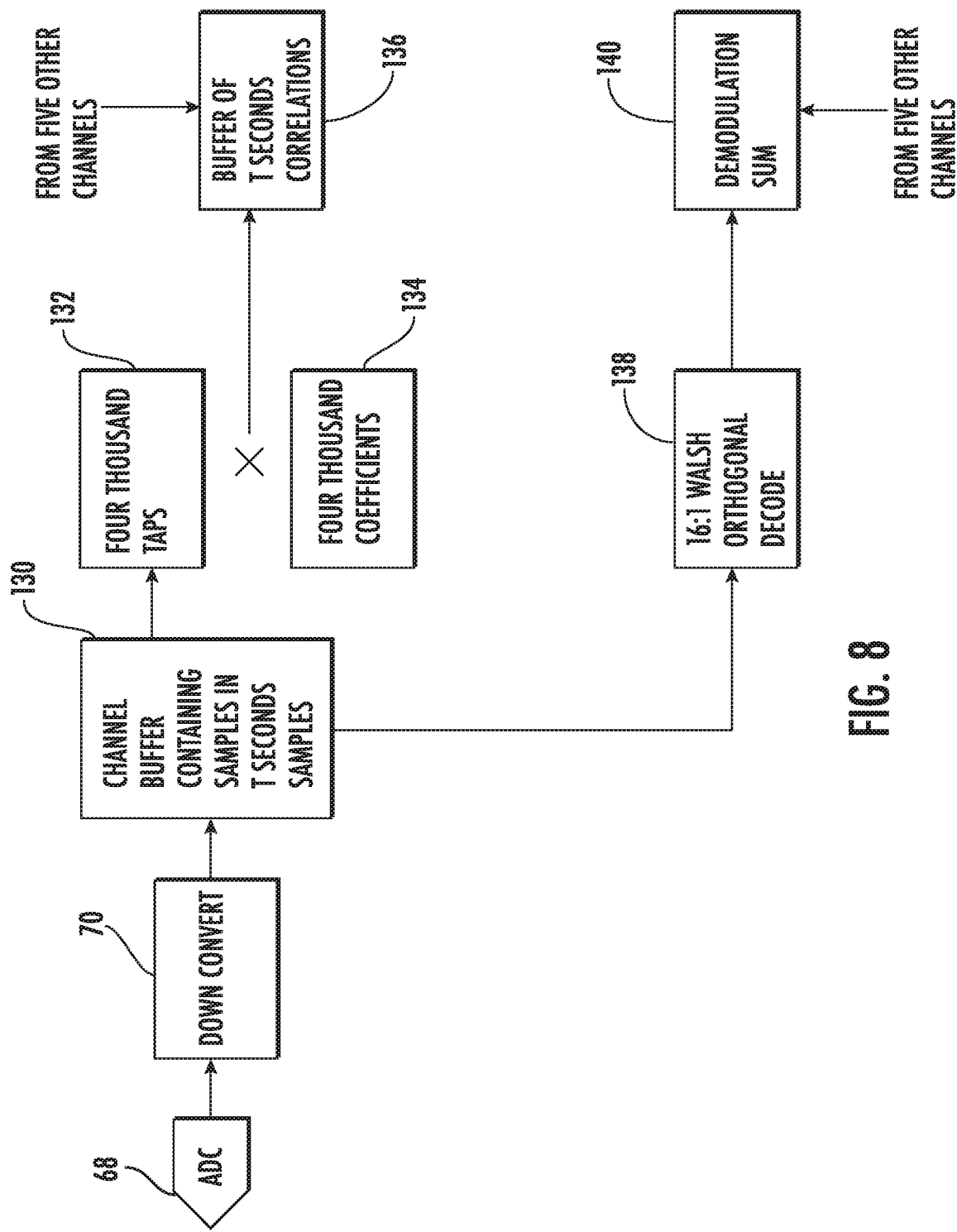
FIG. 8 is a block diagram showing functional components in the operation of the receiver of FIGS. 1, 4, and 6.

Referring now to FIG. 8, there is illustrated an example implementation of further functional components of the receiver 60 that occurs when five subcarriers are received and processed, in this example, downconverted signals from downconverters 70 may be received within a channel buffer 130 as part of the despreading stage 72 and containing up to Z second samples. Four thousand taps 132 are multiplied with 4,000 coefficients 134 and the single complex number as a sum of 4,000 complex multiplications is received within a buffer of T second correlations 136 where data is also received from the five other channels. The samples from the channel buffer may be processed at the 16:1 Walsh orthogonal decode 138 at a lower complexity. It should be understood that this is not limited to a 16:1 orthogonal Walsh, but this value is representative in this non-limiting example. The demodulation sum 140 is calculated with the results received from five other channels. T second represents the amount of delay over the link range. As an example, a 33 microsecond delay occurs from time to start, which is a 10 km range delay. When the sum of all five channels adds up to the receipt of a correlation signal, a second pass starts the Walsh decoding of chips. As mentioned before, this implementation is not limited to five channels as previously discussed.

The following Table 1 illustrates an example of where as the total bandwidth increases, the coefficients may increase and the corresponding processing time increases.

TABLE 1

| "(a + bj) * (c + dj)" | | | | |
|---|---|---|---|---|
| Bandwidth | Coefficients | MAC | Seconds | GMAC's /Second |
| 40000000 | 4000 | 4 | 0.000000025 | 0.64 |
| 80000000 | 8000 | 4 | 1.25E−08 | 2.56 |
| 160000000 | 16000 | 4 | 6.25E−09 | 10.24 |
| 320000000 | 32000 | 4 | 3.125E−09 | 40.96 |
| 640000000 | 64000 | 4 | 1.5625E−09 | 163.84 |
| 1280000000 | 128000 | 4 | 7.8125E−10 | 655.36 |
| 2560000000 | 256000 | 4 | 3.90625E−10 | 2621.44 |
| 5120000000 | 512000 | 4 | 1.95313E−10 | 10485.76 |
| 10240000000 | 1024000 | 4 | 9.76563E−11 | 41943.04 |

Figure 9:
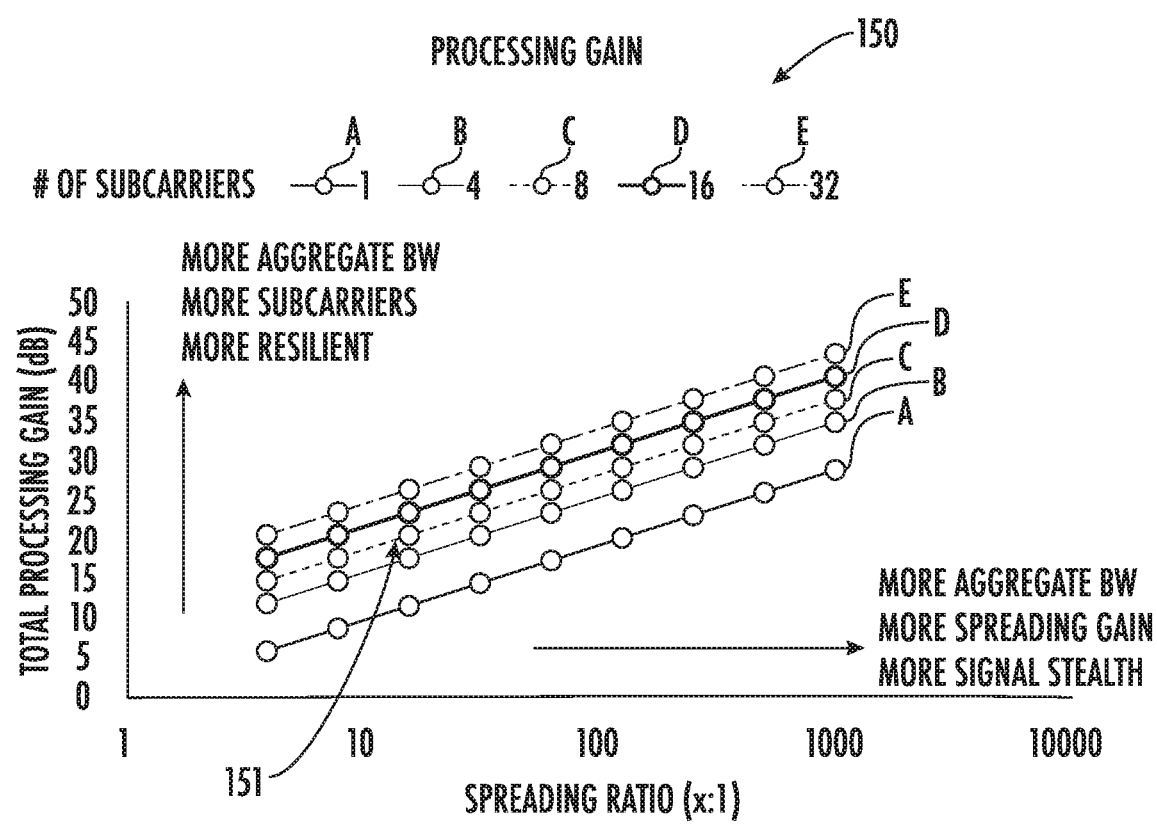
FIG. 9 a graph showing the processing gain as a function of the spreading ratio of each carrier and the total number of carriers using the communications system of FIG. 1.

The processing gain may be adjusted to adapt to different conditions such as shown at 150 in the graph of FIG. 9. The number of bands are illustrated by the letters A, B, C, D, and E. As illustrated, the processing gain in decibels is shown relative to the spreading ratio of x:1. The number of subcarriers is illustrated as including 1, 4, 8, 16 and 32 bands corresponding to the indicia A, B, C, D, and E. More sub-bands allow the information and bandwidth to be more resilient, and the more spread the sub-bands are in bandwidth, the more the signal stealth occurs with a low probability of detection. For example, eight sub-bands are shown with 9 dB of processing gain plus a 16:1 spreading for each sub-band adds 12 dB to a total of a 21 dB processing gain as indicated at 151. The spread spectrum and multicarrier gain is equal to the spreading gain plus the correlation gain in dB. The multicarrier signals improve data reception when the spectrum is partially blocked, while the spreading improves the low probability of detection (LPD) and immunity to narrow band interference. Thus, the communications system 20 adapts the spreading gain and the correlation gain to channel dynamics, by adjusting the robustness and low probability to detection.

Figure 10:
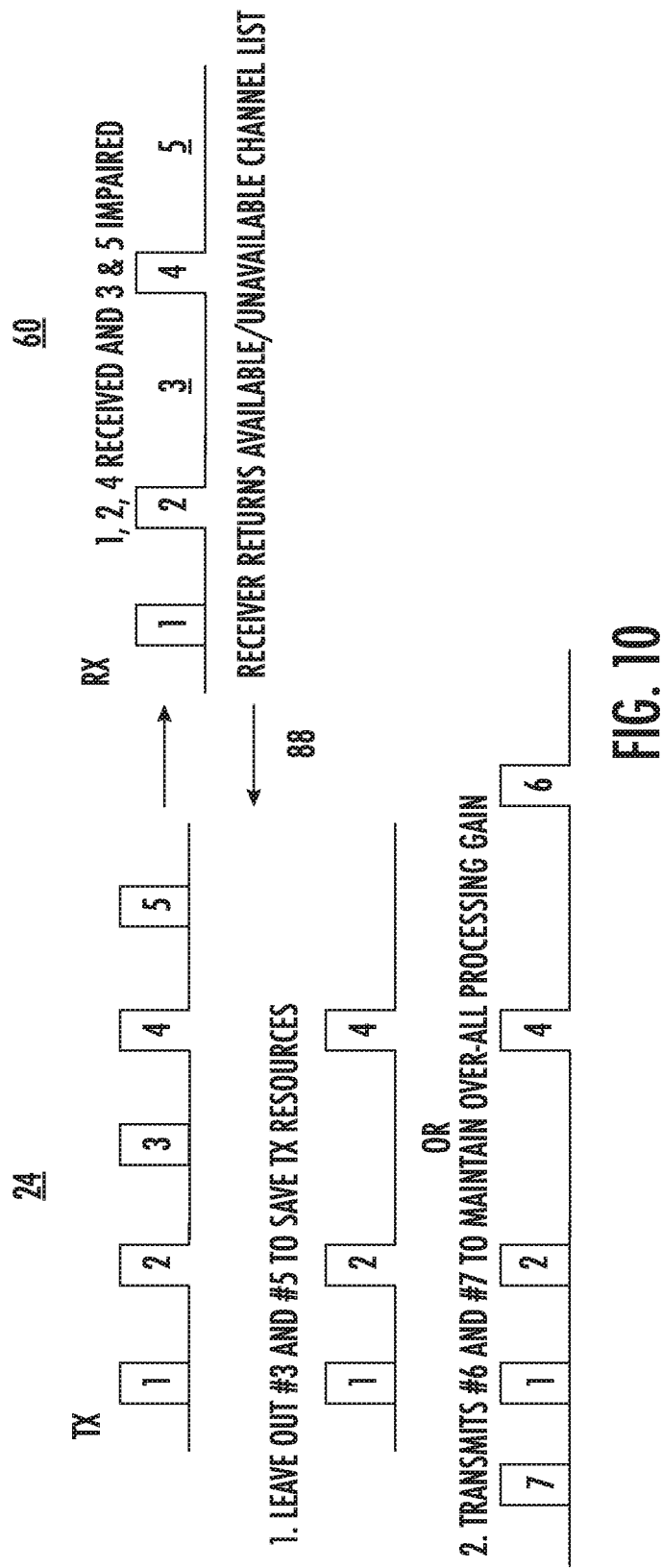
FIG. 10 is a schematic diagram showing the function of the transmitter control signal based on channel availability.

Referring now to FIG. 10, there is shown different transmitter 24 and receiver 60 channels where the ability to determine the channel availability increases the resilience in the presence of impairment or jamming to optimize radio resources when the receiver transmits the transmitter control signal 88. For example, the transmitter 24 may transmit redundantly on all five channels and the receiver 60 may receive channels 1, 2, and 4, and channels 3 and 5 may be impaired. The receiver 60 may transmit the transmitter control signal 88 to indicate to the transmitter 24 which channels are available and which are unavailable as channel listing. The transmitter 24 may remove data transmission on channels 3 and 5 to save transmitter resources, or transmit on new channels 6 and 7 to maintain the overall processing gain as illustrated.

Figure 11:
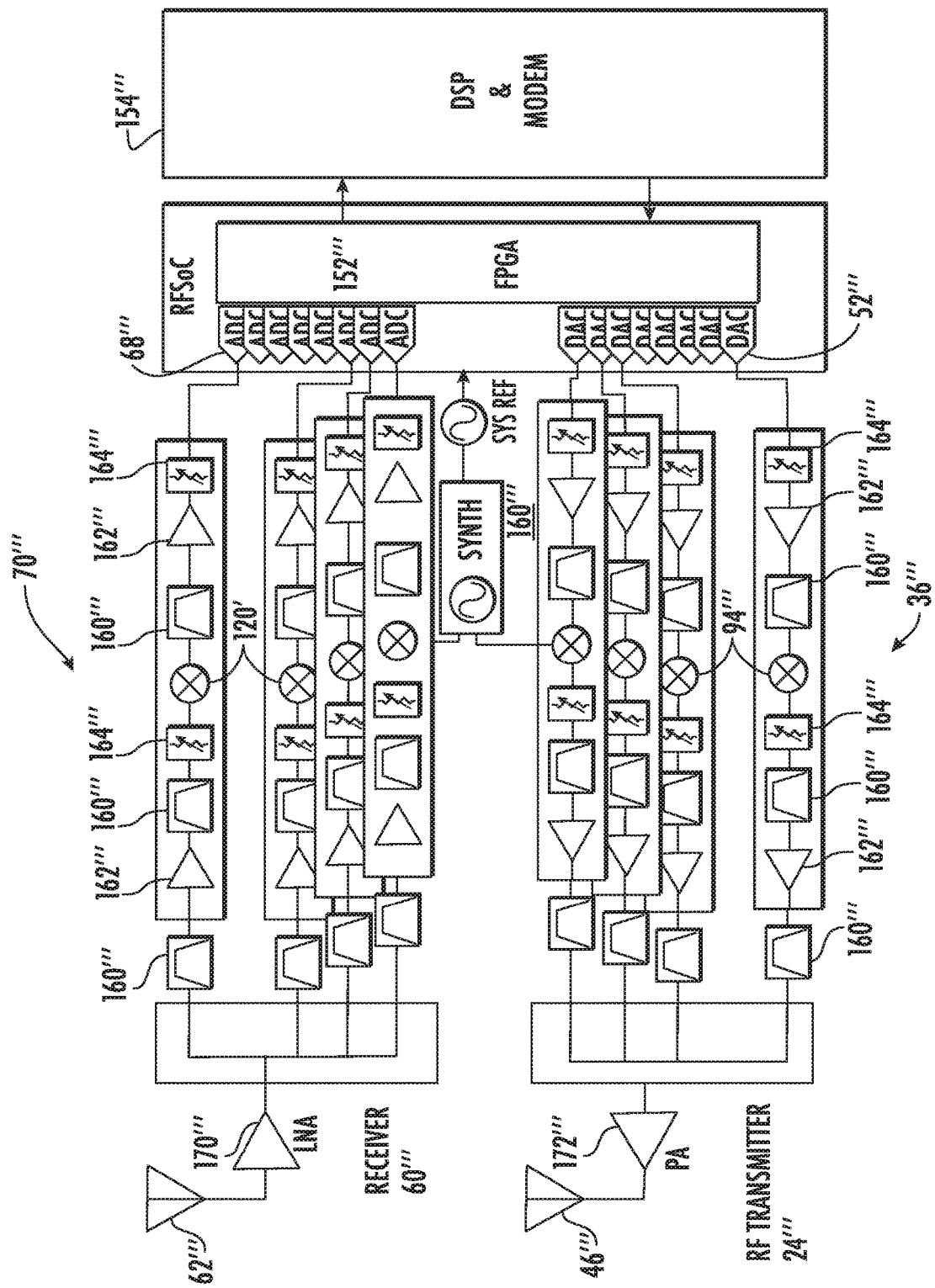
FIG. 11 is a generalized block diagram showing components of the co-located transmitter and receiver implementation to support wide signal bandwidth (multiple GHz) in a non-limiting example.

Referring now to FIG. 11, there are shown further details of a co-located RF transmitter 24''' and receiver 60''' formed together as a single transceiver, such as a mobile wireless communications device, and in this example, the reference numerals common to components in FIGS. 1, 3 and 4 are given triple prime notation. The different ADC's 68''' and DAC's 52''' are connected to a common field programmable gate array (FPGA) 152''', for example, as a RF System on Chip (RFSoC), and may be used in conjunction with a Digital Signal Processor (DSP) and modem 154''' to incorporate the functions of a plurality of spreading and despreading stages. A common system synthesizer circuit with multiple frequency outputs 160''' may operate with the downconverters 70''' and upconverters 36''' that include transmitter and receiver mixers 94''', 120''', and appropriate filters 160''', amplifiers 162''', and variable attenuators 164''' for better gain control signal processing. The receiver 60''' may include a low noise amplifier (LNA) 170''' and the RF transmitter 24''' may include a power amplifier 172'''.

Figure 12:
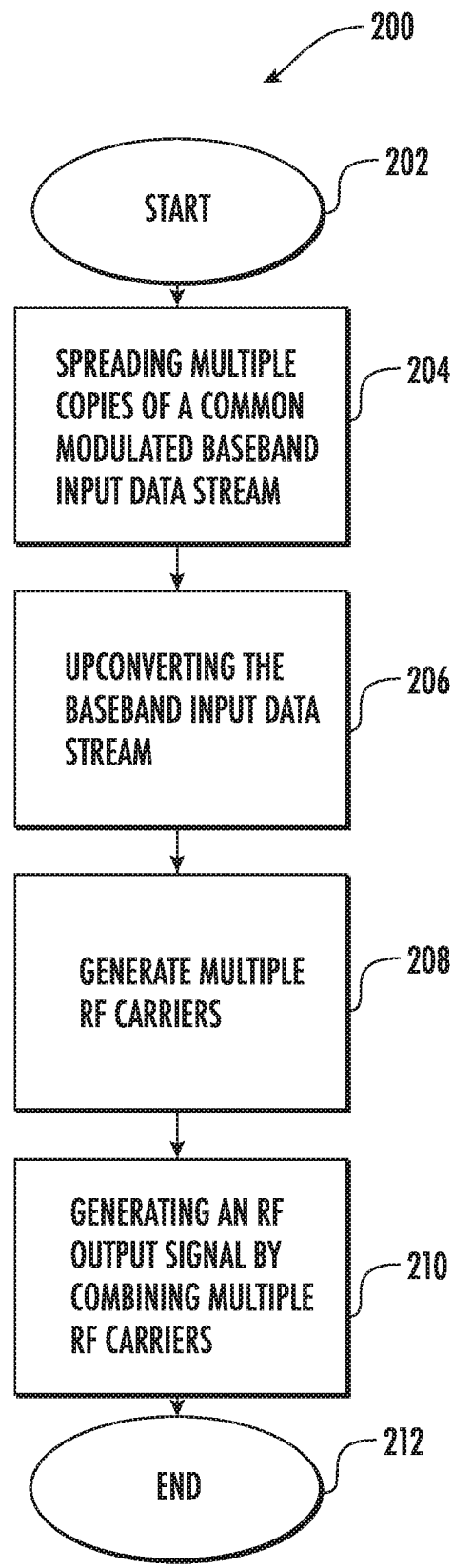
FIG. 12 is a high-level flowchart of a method for operating the transmitter of FIG. 1.

Referring now to FIG. 12, there is illustrated a high level flowchart of a method for operating the transmitter 24 of FIG. 1 and illustrated generally at 200. The process starts (Block 202) and the method includes spreading with a plurality of spreading stages 30 multiple copies of the common modulated baseband input data stream (Block 204). The method further includes upconverting the modulated baseband input data stream with a plurality of upconverters 36 (Block 206) and generating multiple RF carriers (Block 208) and generating an RF output signal by combining multiple RF carriers as sub-bands within the RF output stage 42 (Block 210). The process ends (Block 212).

Figure 13:
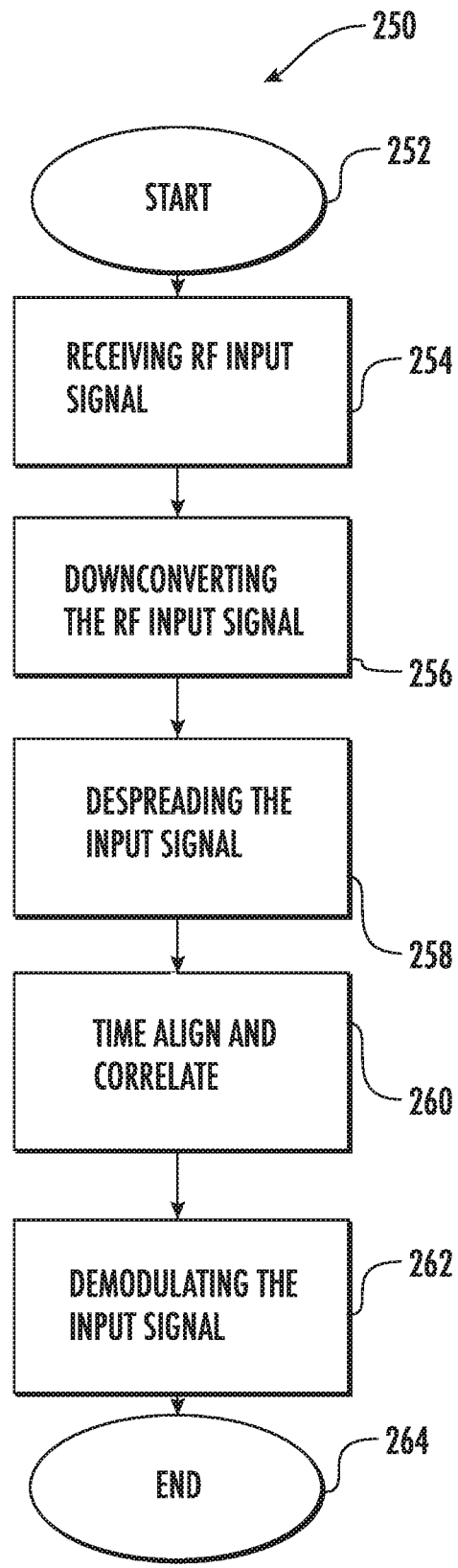
FIG. 13 is a high-level flowchart of a method for operating the receiver of FIG. 1.

Referring now to FIG. 13, there is illustrated at 250 a method of operating the receiver 60. The process starts (Block 252) by receiving an RF input signal with an RF input stage 64 (Block 254). The method includes downconverting the input signal with a plurality of downconverters 70 (Block 256) and despreading the input signal within despreading stages 72 (Block 258). The method includes time aligning and correlating (Block 260) demodulating the input signal (Block 262) after time-aligning and correlating all the sub-bands and the process ends (Block 264).

The communications system 20 as described may operate with low power and low bandwidth components, such as the ADC 68 and DAC 52, and create an ultra-wideband modulation scheme and provide scalability where ADC and DAC components may be adjusted in number. The communications system 20 provides a low probability of detection (LPD) to defeat reactive jammers and the scalability of the communications system 20 allows the ability to adapt low probability of intercept (LPI) and low probability detection (LPD) waveforms to different platforms with different resource and frequency constraints.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
   a transmitter comprising
      a modulator configured to receive input data and copy the input data into a plurality of common modulated baseband input data streams, each having the same input data,
      a plurality of spreading stages configured to spread the common modulated baseband input data streams based upon respective coefficient sequences,
      a plurality of upconverters, each upconverter coupled to a respective spreading stage, and each upconverter having a different frequency, and
      an RF output stage coupled to the plurality of upconverters to generate an RF output signal, wherein the RF output stage comprises a plurality of digital-to-analog converters (DACs) coupled to the plurality of upconverters, a combiner coupled to the plurality of DACs, and another upconverter coupled to the combiner; and
   a receiver comprising
      an RF input stage configured to receive an RF input signal,
      a plurality of downconverters coupled to the RF input stage,
      a plurality of despreading stages, each despreading stage coupled to a respective downconverter, and
      a demodulator coupled to the plurality of despreading stages.

2. The communications system of claim 1 wherein each of the spreading stages operates using a common spreading sequence.

3. The communications system of claim 1 wherein each of the spreading stages operates using a different spreading sequence.

4. The communications system of claim 1 wherein the different operating frequencies of the plurality of upconverters are configured to generate a plurality of carriers, each with a guard band associated therewith.

5. The communications system of claim 1 wherein the RF input stage comprises an RF downconverter and a plurality of analog-to-digital converters (ADCs) coupled thereto.

6. The communications system of claim 1 wherein the demodulator is configured to perform a demodulation and time alignment upstream of the demodulation.

7. The communications system of claim 1 wherein the transmitter and receiver are collocated.

8. The communications system of claim 1 wherein the transmitter and receiver are spaced apart from one another.

9. The communications system of claim 1 wherein the receiver is configured to send a transmitter control signal based upon channel availability.

10. A transmitter comprising:

a modulator configured to receive input data and copy the input data and output a plurality of common modulated baseband input data streams, each having the same input data;

a plurality of spreading stages configured to spread the common modulated baseband input data streams based upon respective coefficient sequences;

a plurality of upconverters, each upconverter coupled to a respective spreading stage, and each upconverter having a different frequency; and an RF output stage coupled to the plurality of upconverters to generate an RF output signal, wherein the RF output stage comprises a plurality of digital-to-analog converters (DACs) coupled to the plurality of upconverters, a combiner coupled to the plurality of DACs, and another upconverter coupled to the combiner.

11. The transmitter of claim 10 wherein each of the spreading stages operates using a common spreading sequence.

12. The transmitter of claim 10 wherein each of the spreading stages operates using a different spreading sequence.

13. The transmitter of claim 10 wherein the different operating frequencies of the plurality of upconverters are configured to generate a plurality of carriers, each with a guard band associated therewith.

14. A method of operating a transmitter comprising:

copying within a modulator input data into a plurality of common modulated baseband input data streams each having the same input data;

spreading with a plurality of spreading stages the common modulated baseband input data streams based upon respective coefficient sequences;

upconverting the baseband input data streams with a plurality of upconverters, each upconverter coupled to a respective spreading stage, and each upconverter having a different frequency;

converting the upconverted baseband input data streams by a plurality of digital-to-analog converters; and generating an RF output signal with an RF output stage coupled to the plurality of digital-to-analog converters by combining multiple RF carriers within a combiner coupled to the plurality of digital-to-analog converters and upconverting the combined multiple RF carriers within an upconverter coupled to the combiner.

15. The method of claim 14 comprising operating each of the spreading stages using a common spreading sequence.

16. The method of claim 14 comprising operating each of the spreading stages using a different spreading sequence.

17. The method of claim 14 wherein the different operating frequencies of the plurality of upconverters are configured to generate a plurality of carriers, each with a guard band associated therewith.

* * * * *